United States Patent [19]
Kent

[11] Patent Number: 5,699,353
[45] Date of Patent: Dec. 16, 1997

[54] EXTENDED TRUNKED RF COMMUNICATIONS SYSTEMS NETWORKING

[75] Inventor: James S. Kent, Lynchburg, Va.

[73] Assignee: Ericsson GE Mobile Communications, Inc., Lynchburg, Va.

[21] Appl. No.: 156,785

[22] Filed: Nov. 24, 1993

[51] Int. Cl.$^6$ .................................... H04B 3/16
[52] U.S. Cl. .................... 370/315; 370/501; 379/60; 455/33.1
[58] Field of Search .............. 370/85.11, 95.1, 370/85.9, 67, 85.7, 68.1, 95.3, 274, 278, 280, 284, 310, 312, 314, 315, 319, 321, 323, 324, 338, 341, 346, 347, 349, 376, 385, 387, 389, 438, 451, 493, 501, 502, 503, 105.1, 110.1, 100.1; 455/94.2, 54.1, 54.2, 34.1, 34.2, 57.1, 58.1, 11.1, 33.1, 33.2, 51.1, 56.1; 375/3, 106, 107, 211, 216, 355, 356; 379/4, 59, 60, 62

[56] References Cited

U.S. PATENT DOCUMENTS

| | | | |
|---|---|---|---|
| 3,789,359 | 1/1974 | Clark, Jr. et al. | 371/46 |
| 3,789,360 | 1/1974 | Clark, Jr. et al. | 371/43 |
| 4,583,078 | 4/1986 | Shenoy et al. | 341/51 |
| 4,698,805 | 10/1987 | Sasuta et al. | 370/97 |
| 4,797,947 | 1/1989 | Labedz | 455/33.3 |
| 4,803,726 | 2/1989 | Levine et al. | 380/48 |
| 4,807,222 | 2/1989 | Amitay | 370/85.2 |
| 4,817,190 | 3/1989 | Comroe et al. | 455/60 |
| 4,833,701 | 5/1989 | Comroe et al. | 379/60 |
| 4,901,314 | 2/1990 | Lohrbach | 371/11.2 |
| 5,014,345 | 5/1991 | Comroe et al. | 455/54.2 |
| 5,020,132 | 5/1991 | Nazarenk et al. | 375/214 |
| 5,093,829 | 3/1992 | Maher | 370/85.8 |
| 5,095,529 | 3/1992 | Comroe et al. | 455/16 |
| 5,144,644 | 9/1992 | Borth | 375/96 |
| 5,159,315 | 10/1992 | Schultz et al. | 340/539 |
| 5,159,695 | 10/1992 | Comroe et al. | 455/9 |
| 5,161,154 | 11/1992 | Diaz et al. | 370/95.1 |
| 5,175,727 | 12/1992 | Maher et al. | 370/58.1 |
| 5,212,832 | 5/1993 | Ness-Cohn | 455/54.1 |
| 5,222,248 | 6/1993 | McDonald et al. | 455/33.2 |
| 5,235,631 | 8/1993 | Grube et al. | 379/58 |
| 5,239,466 | 8/1993 | Morgan et al. | 395/148 |
| 5,239,680 | 8/1993 | Grube et al. | 455/38.1 |
| 5,253,253 | 10/1993 | Brame et al. | 370/85.11 |
| 5,282,204 | 1/1994 | Shpancer et al. | 370/95.1 |
| 5,329,530 | 7/1994 | Kojima | 370/95.3 |
| 5,400,325 | 3/1995 | Chatwani et al. | 370/60.1 |
| 5,475,683 | 12/1995 | Harrison et al. | 370/95.1 |
| 5,481,541 | 1/1996 | Maedjaja et al. | 370/95.1 |

*Primary Examiner*—Dang Ton
*Attorney, Agent, or Firm*—Nixon & Vanderhye P.C.

[57] ABSTRACT

In a trunked communications network, a multiple site information distribution control "switch" (multisite switch) provides access to digitized audio and control signals from various audio sources to one or more audio destinations connected at various "nodes" in the multisite switch. A dedicated Network Interface Module (NIM) is provided in the multisite switch to facilitate interconnection and communication between multiple networks of similar multisite switch controlled architectures to create an "extended" mega-network. The NIM allows an entire remote network to appear as a just another multisite switch node in a local network and vice versa. A trunked communications network having a NIM can communicate through this "node" with other networks having a NIM, thus establishing inter-network communications in a manner that is essentially transparent to users in either network. The use of a plurality of NIMs per multisite network allows connection of multiple networks together, for example, in a "star" or series configuration, to greatly expand geographic coverage.

10 Claims, 15 Drawing Sheets

FIG. 2 MULTI-SITE ARCHITECTURE

FIG. 4    INTERFACE MODULE (NODE) CONTROLLER ARCHITECTURE

EXTENDED TRUNKED RF COMMUNICATIONS SYSTEMS NETWORKING

FIELD OF THE INVENTION

The present invention generally relates to a distributed control multisite switch architecture which coordinates digitally trunked radio frequency (RF), digital data and digital audio communications within a network of multiple sites, and, more particularly, to a network interface which allows the interconnection of a plurality of multisite switch controlled networks together to form an extended overall network of communication systems.

BACKGROUND AND SUMMARY OF THE INVENTION

Trunked RF repeater systems have become a mainstay of modern RF communications systems, and are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (timesharing) of the limited number of RF channels among a large number of users. A number of such systems are commercially available, such as the Clearchannel LTR system from E. F. Johnson and the Smartnet and Privacy Plus systems from Motorola.

Briefly, such digitally trunked RF communications systems include a "control" RF channel and multiple "working" RF channels. The working channels are used to carry actual communications traffic (e.g., analog FM, digitized voice, digital data, etc.). The RF control channel is used to carry digital control signals between the repeater sites and user RF transceivers (radiounits) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system is disclosed in commonly-assigned U.S. Pat. Nos. 4,905,302 and 4,903,321.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

However, to enable communications from one area to another a switching network, as for example the assignee's "multisite switch" described herein, must be provided to establish audio and control signal pathways between repeaters of different sites. Moreover, such pathways must be set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned channel is applicable only within the area covered by the site.

In addition, the site controller sends the channel assignment to the multisite switch (200) which assigns an internal audio slot to the call. The multisite switch also sends a channel request over a control messaging bus to other site controllers having a designated callee within their site area. Audio signals are routed such that audio pathways are created to serve the callee(s) and one or more dispatcher consoles 202 involved in the communication. Upon receiving a channel request, these "secondary" site controllers (in the sense they did not originate the call) assign an RF working channel to the call. Each secondary channel is operative only in the area covered by the secondary site controller. The secondary site controller(s) also sends the channel assignment back up to the multisite switch.

Thus, the caller communicates with a unit or group in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

In addition to providing communications between mobile radio units in different areas, multisite switch 200 provides communications between land-line telephone subscribers and radio units as well as dispatchers and mobile radio units. Land-line telephone subscribers can communicate with radio units by dialing an access number as well as a radio unit (or group) identification number which is routed to the trunked communications system through a central telephone interconnect switch (CTIS) 212 and multisite switch 200. One or more dispatch consoles 202 is connected to the multisite switch in the same manner as the site controllers 102. Both land-line subscribers and dispatch console operators can issue a channel call request through the multisite switch to a site controller 102 to call for example a mobile radio unit.

Each dispatch console 202 may participate in calls in its area. Thus, when a call comes through the multisite switch from another area to a mobile radio, the switch informs the dispatch console 202 of the call in addition to notifying the corresponding site controller 102. The dispatch operator can then listen or participate in the call. Multisite switch 200 also handles calls to groups of mobile units and/or dispatch consoles by ensuring that the site controllers for all of the callees in the group assign a channel to the group call.

The multisite switch has a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the cards have substantially the same hardware and are interchangeable. Each card acts as a gateway interface into the distributed control switch network.

Detailed description and operation of the multi-site switch, generally, is set forth in commonly assigned U.S. patent application Ser. No. 07/658,844 filed Feb. 22, 1991 entitled "Distributed Multisite Switch Architecture", the disclosure of which is also incorporated herein by reference.

In general, trunked communications systems of the type described above operate independent of one another. Consequently, a user (or "communications unit") located in a first multisite communications system is not generally able to communicate with a second user located in a second multisite communications system. Thus, the overall coverage available to a user is limited to the particular coverage areas of a single multisite communications system. The present invention overcomes this limitation by providing fully trunked communication links between one or more multisite systems in a manner that is fast, flexible, compatible with existing multisite switch architecture and essentially transparent to users. More specifically, a dedicated Network Interface Module (NIM) is provided in the multisite switch to permit the interconnection and communication between multiple multisite switch controlled networks to create an extended overall communications network. In accordance with a preferred embodiment of the present invention, the Network Interface Module allows a remote multisite switch controlled network to appear as just another node to the local multisite switch. Each network can then communicate over this commom "node" interface permiting internetwork communication that is predominantely transparent to a network user. Moreover, using a plurality of network interface modules per switch, the overall communications network can be much extended by connecting individual multisite switch controlled networks together, for example, in series, "star" or multiple "star" configurations.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following limitation, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

Figure 1:
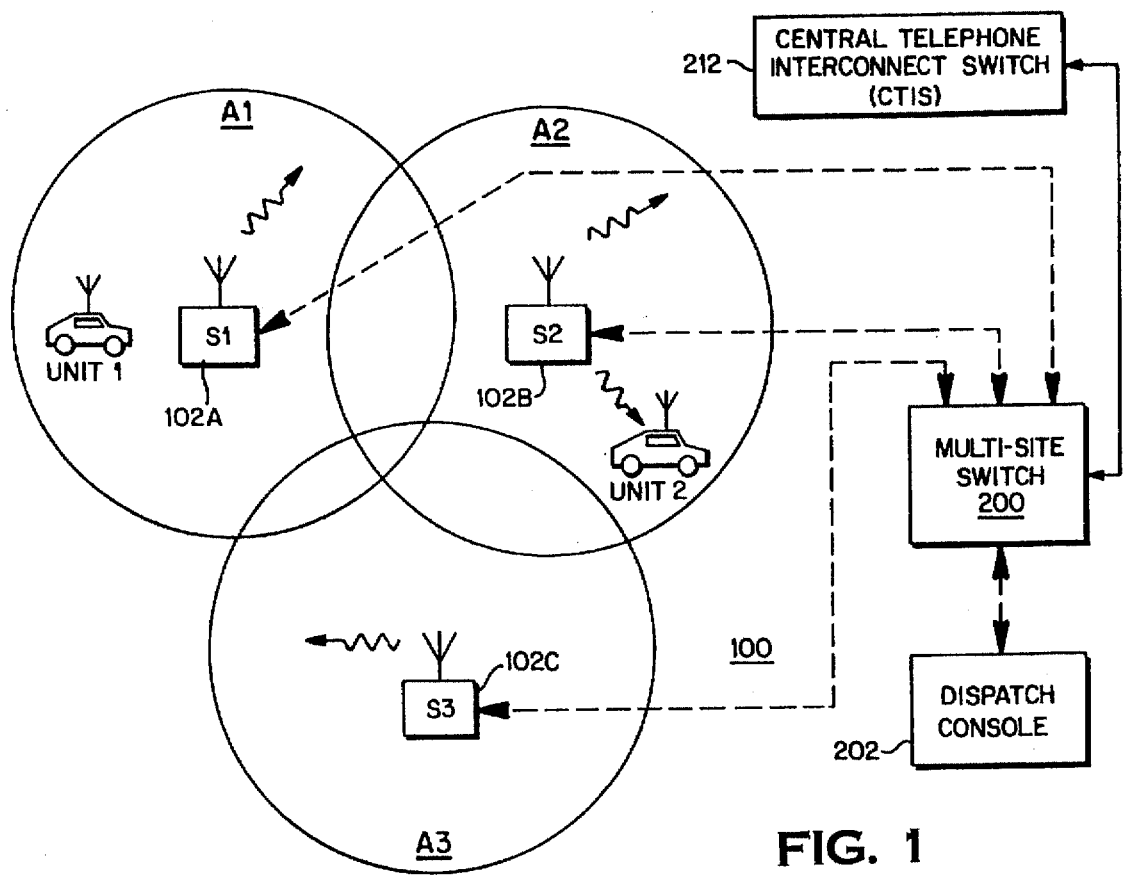
FIG. 1 is a schematic illustration of an exemplary multisite trunked RF communications system.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to multisite switch 200. The switch, in turn, sends a channel request to all other site controllers and routes audio signals such that an audio signal pathway is created between the RF repeater servicing the caller and the RF repeater(s) servicing the callee(s). Additional audio signal pathways may also be established in similar fashion such that one or more dispatch consoles 202 and land-line subscribers may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

Figure 2:
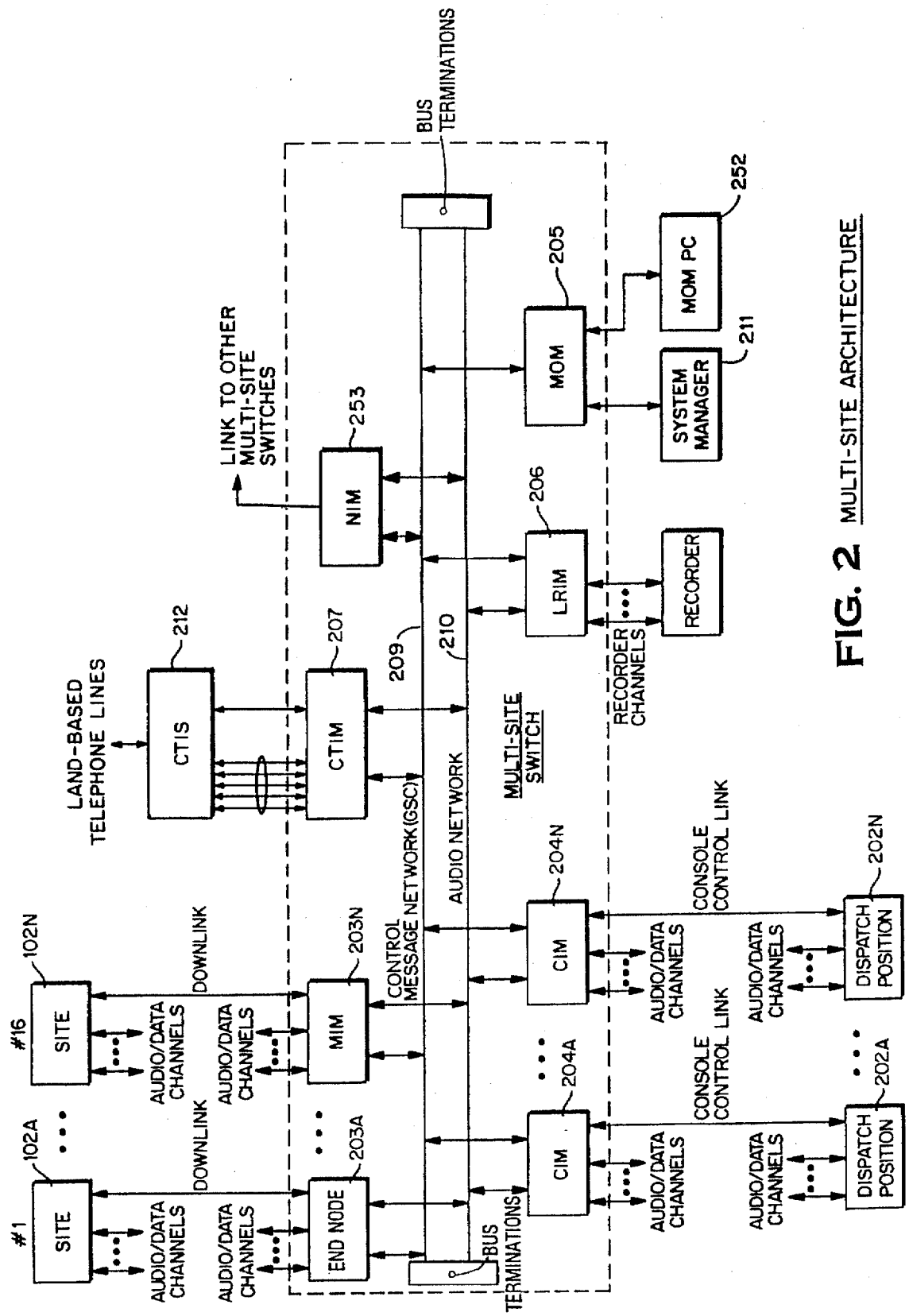
FIG. 2 is a schematic of an exemplary architecture for a distributed, digitally trunked, RF communications multisite switching network.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines which may include dedicated land lines or microwave links.

The multisite switch 200 establishes and removes audio connections between sites 102 and dispatch consoles 202 using a local area network of nodes (e.g., MIMs, CIMs, NIMs, CTIM, and MOMs). As shown in FIG. 2, the nodes are labelled corresponding to whether they interface with a site controller, dispatch console, landline telephone switch, another multisite switch or some other system component (or as in the case of MOM 205 perform some other control function). For example, MIMs 203 are interface modules in the switch that interface with site controllers and CIMs 204 are nodes that interface with dispatch consoles. The MOM supervises control communications over the control message bus and interfaces the system manager 211 and the MOM PC (personal computer) 252 that have supervisory responsibility for multisite switch 200 and the overall radio communications system as connected through the switch. The LRIM (206) interfaces recorders to the switch assigned to log calls for various groups or units. The CTIM (207) functions much the same as a MIM with respect to interfacing a site to the multisite switch except that it interfaces to landline telephone lines from Central Telephone Interconnect Switch (CTIS) 212 to switch 200. The Network Interface Module (NIM) interfaces one multisite switch 200 to another multisite switch at another similar radio communications system to provide an even greater coverage area. Using NIM 253, multiple multisite switches can be connected in various configurations to provide a much extended communications network as discussed in greater detail herein below.

Each node in the multisite switch is supported by a microprocessor-based controller module. All of the nodes (the MIMs, CIMs, CTIM, MOM, LRIM, and NIM) have the same hardware and are interchangeable. The nodes have different "personalities" to indicate that they are assigned to, for example, a site controller or a dispatch console, etc. Each node can be easily configured to be a MIM, CIM, etc. by setting a few switches.

As shown in FIG. 2, the nodes of multisite switch 200 are connected into a control message network 209 and a digital audio (TDM) network 210. The control message network is preferably a message network employing a conventional Global Serial Channel (GSC) digital messaging protocol, for example, as implemented using an Intel 80C152 GSC microprocessor. The GSC microprocessor is used as the communications controller in the controller module in each node and is essentially dedicated to performing I/O functions for the node. The control message bus 209 is a high speed data bus that interconnects the communication processors in the controller of each node.

The audio bus 210 comprises up to thirty-two (32) time division multiplexed (TDM) buses in the preferred embodiment. Each bus contains thirty-two (32) slots, each slot corresponding to a single audio channel. Therefore, a maximum of 1024 audio slots may be routed through the multisite switch (i.e., 32 buses×32 slots), although some of the slots are used for other purposes (e.g. signalling). In the presently preferred embodiment, eight (8) buses are provided and only 240 channels of digitized audio are carried by audio TDM network 210.

MOM 205 is the interface module for System Manager 211 and MOM PC (personal computer) 250. The System Manager updates databases maintained in all of the nodes. The MOM 205 maintains certain specialized databases including databases for smart calls, confirmed calls, and activity status of every node in the network. Smart calls relate to the operation of the dispatch console 202. A call is "smart" if the call is selected by the dispatcher via a select speaker in the console 202. A confirmed call is one for which the audio channel and slot assignments must be confirmed before the caller begins talking. A node's status (e.g., active or inactive) is monitored periodically by the MOM. Polling messages from the MOM addressing specific blocks of nodes are transmitted over control message bus 209. Each node monitors the control message bus to determine if its address falls in the range currently being addressed. If it is, the node responds to the poll by sending a Node Access Message (NAM) over the message bus to the MOM. The MOM then correlates each received NAM with its corresponding node of origin to record its active status in the node activity status data base.

As part of the multisite switch initialization procedure, the nodes connect their assigned TDM bus slots to the node's external channel inputs. For example, a MIM will assign each channel from its site controller to a separate audio TDM bus slot on audio network 210. Once the TDM bus slot is linked to the site channel, the bus slot continuously receives the output from the channel through the host node without requiring further channel setup. Of course, the site channel has no intelligible signal until it is assigned to a call by the site controller. Although a TDM bus slot is linked to a corresponding site channel, no other nodes (MIM, CIM, etc.) listen to that bus slot until the host node sends a slot assignment message throughout multisite switch 200 over message network 209 notifying all nodes that an active call from the site has been assigned to that bus slot.

Figure 3:
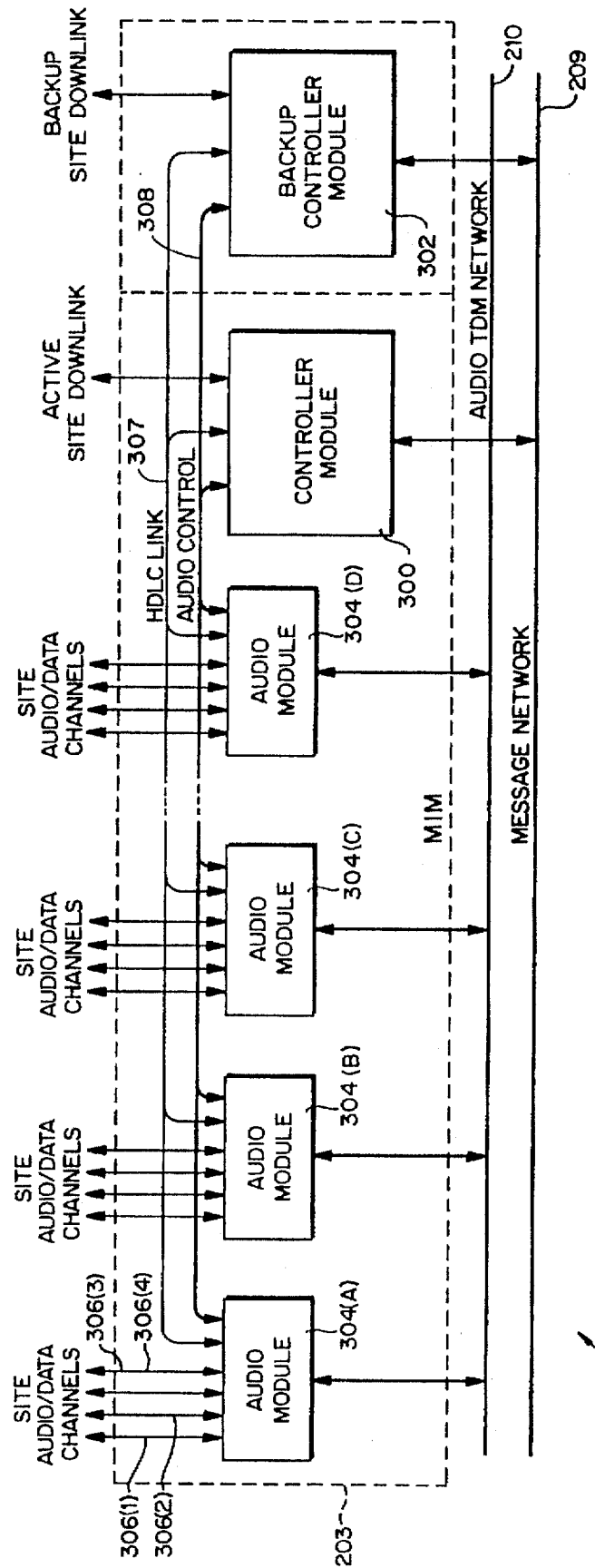
FIG. 3 is a detailed block diagram of a single exemplary node (with multiple audio sources/destinations) shown in FIG. 2.

FIG. 3 is a high level block diagram of a single (multiple audio channel) exemplary MIM 203 provided by the presently preferred exemplary embodiment of this invention. The architecture of other nodes is virtually the same as that for the MIM. As mentioned above, the "highway" used to communicate signals between interface modules includes an audio (TDM) network 210 and a control message network ("GSC") 209. The TDM audio bus simply transfers whatever digital information is placed on the TDM bus slot. MIM 203 typically services multiple RF channels providing multiple audio source/destinations each of which are connected independently to a TDM bus slot.

MIM 203 includes a controller module 300, a backup controller module 302, and plural (preferably eight) audio modules 304 (only four are shown for purposes of illustration). Each audio module 304 in the preferred embodiment is connected to a maximum of four RF repeaters of an RF trunking site, or in the case of a CIM and a CTIM (for console and landline communications) to four bidirectional audio links. For example, audio module 304(A) includes bidirectional audio links 306(1)-306(4) serving associated first through fourth trunked RF repeater site "channels" (i.e., RF transceiving/repeating decks associated with particular trunked RF channels). The audio modules 304 act as source gateways ("entrance/exit ramps") which convert analog audio signals generated by MODEMs from the trunked repeater sites into digitized audio (PCM) signals and place the digitized audio signals onto the audio TDM network 210. These same audio modules 304 act as audio destinations by taking selected signals from the audio TDM network 210, converting them from digital into analog form, and providing the resulting analog signals to the RF repeater site "channels" for transmission via RF links.

Controller module 300 communicates with each of the four audio modules 304 via a common HDLC link 307 and an audio control link 308. The HDLC link 307 is used, for example, to carry fault indications and messages relating to RF "channel" status between audio modules 304 and controller module 300. Audio control link 308 permits the controller module node 300 to set channel parameters (e.g., level adjustment, TDM slot assignment, etc.) within each audio module 304.

Detailed description and operation of the audio modules 304 is set forth in commonly assigned U.S. patent application Ser. No. 07/658,636 entitled "Audio Routing Within Trunked Radio Frequency Multisite Switch" filed on Feb. 22, 1991 and incorporated herein by reference.

Figure 4:
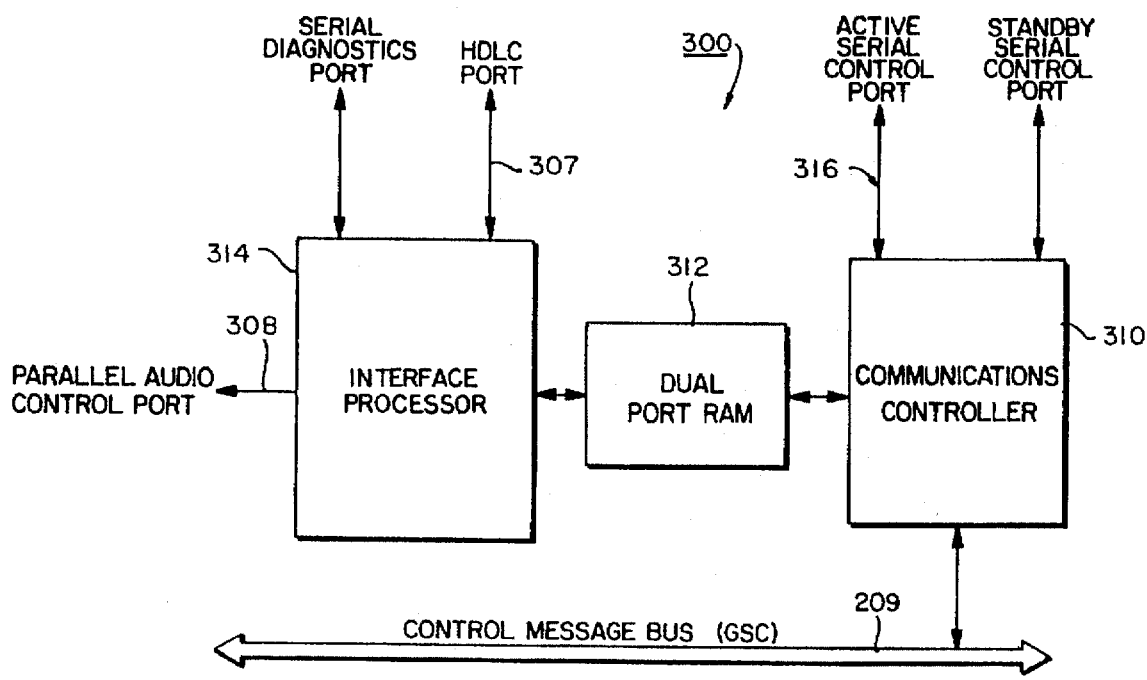
FIG. 4 is a block diagram illustrating the node (interface module) data processing and control message bus architecture.

FIG. 4 shows a block diagram of an exemplary architecture for node controller 300. Each node controller 300 includes a communications controller 310, a dual-port random-access-memory (RAM) 312 and an interface processor 314. Communications controller 310 receives and routes control messages between the control message bus 209 and interface processor 314. Communications controller 310 may be, for example, an Intel 80C152 GSC microprocessor. Dual-port RAM 312 is used to communicate between the communications controller and the interface controller. Messages received from site controller 102 over the serial port 316 are translated into a format usable by the multisite switch. The communications controller 310 also translates multisite switch messages into a format that the site controller or console understands.

Interface processor 314 performs substantially all the logical functions for the node (interface module) and is effectively the "intelligence" of MIM 203. Interface processor 314 (which may be, for example, an Intel 80C186 microprocessor) initially assigns TDM bus slots to channels for the individual RF transceivers associated with audio links 306(1)-306(4) of audio modules 304 using parallel audio control bus 308. The interface processor sets up the connection between a site RF channel (or an audio/dam channel at a dispatcher console or a CTIS) and the audio slots on the multisite switch TDM audio bus to establish a communications link for a call and also terminates the link when a call ends. As previously described, each MIM is preassigned a set of TDM bus slots for outputting audio signals onto the TDM bus, and these slots are not assigned and de-assigned during the course of normal call routing. A more detailed description of the node controller architecture is provided in commonly assigned U.S. Pat. No. 5,239,538 to Gulliford et al., entitled "Controller Architecture for an RF Trunking Multisite Switch", which is incorporated herein by reference.

Each call through multisite switch 200 is patched from its assigned TDM bus slot on the audio bus 210. Since the interface processor for each node assigns slots, connects audio slots to the site controller or dispatch console to establish a communications link, and terminates calls, the nodes must continually inform each other of their slot assignments when a call involving that slot becomes active. Accordingly, the nodes send control messages regarding slot assignments, slot updates and slot idles over the control message network 209 to other nodes.

The communications controller (310) for each node initially processes all of the messages on the GSC message network (209). Slot assignments are forwarded to the interface processor (314) through a dual-port RAM (312). The communications controller also processes slot update and slot idle messages by referring to a slot bit "map" or database, located and maintained in the dual-port RAM, for all TDM bus slots on the audio bus. By referring to the slot bit map, the communications controller determines whether the slot status message conveys information already known, or if the slot status message conveys new information about a TDM bus slot. Update messages are sent regularly by the nodes hosting calls to confirm to other nodes the active status of a slot. When a host terminates a call, it sends a "slot idle" message to the other nodes and also periodically resends idle messages until the slot is involved in another call. Thus, all nodes are continually informed of the status of all TDM bus slots that have been assigned at least once. A more detailed description of the slot bit map and slot status messages is provided in commomly assigned application serial number 07/658,640 filed on Feb. 22, 1991 entitled "Message Bus Slot Update/Idle Control and RF Trunking Multisite Switch" which is incorporated herein by reference.

Each MIM is coupled to its site controller through a standard serial telephone line or other transmission media. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 (FIG. 2) and sent to all interface modules. The radio unit database identifies each mobile radio unit in the wide area system. For each MIM, some of the mobile units will be in its assigned site area and others will be outside of its area. Each MIM keeps track of which units are in its area and which group(s) is currently selected by the unit. Since each mobile unit may be capable of participating in several different groups, the mobile unit operator selects the desired group at any particular time. Whenever a call comes in for the selected group, then the unit will receive the call.

The MIMs also maintain a group database. A group is a collection of units that communicate together on a single call. For example, there may be a group for the fire department that allows all of the fire trucks to listen to the central dispatcher or the fire chief. The dispatcher programs this group into his console to broadcast messages to all fire trucks. Similarly, groups can be established for rescue stations, police units assigned to a particular precinct, and many other combinations of users of the public service radio system.

When a unit enters a new site area, a log-in message is sent from its new site controller to the corresponding MIM identifying the unit and its currently selected group(s). The MIM receiving the login signal through its serial control port 304, i.e. from the site controller via the downlink, increments the group "count" for the unit's selected group. Similarly, when a unit leaves an area, the corresponding MIM logs the unit out of its group count database by decrementing the count of the unit's current group. In addition, when a unit changes groups, it sends a group login message that causes the MIM for its area to increment the count for the newly selected group and decrement the count of the old group.

The procedures followed by the multisite switch 200 in activating a call from a radio unit and from a dispatcher console, confirming receipt of the call request, and terminating the call are now described. A more detailed description of the messaging and protocols involved in the call setup and takedown procedures is provided in commonly assigned U.S. Pat. No. 5,200,954 entitled "Communication Link Between Multisite RF Trunked Network and an Intelligent Dispatcher Console," the disclosure of which is incorporated herein by reference.

A "primary" MIM receives a radio unit originated channel assignment from its corresponding site controller. This signal indicates that a mobile unit in the area assigned to that MIM wants to call another unit or a group and its site controller has assigned a channel to the call for its area. The MIMs assigned to callees are "secondary" MIMs. The channel assignment is sent to the multisite switch as described above and received in the MIM by the communications controller 310 as are all communications from outside of the multisite switch. The MIM translates the site channel assignment into a TDM bus slot assignment for use within the multisite switch and that the slot assignment is sent to all other interface modules and components. The primary MIM logs that TDM bus slot (i.e. channel) as active and also performs slot status updating tasks by sending slot update messages to the other interface modules.

More specifically, referring again to FIG. 2, the MIM responds to the site originated TDM bus slot assignment by sending messages on the multisite switch message bus 209. A TDM slot assignment message is sent to all multisite switch components (e.g., interface modules or "nodes") identifying the TDM bus slot on the audio bus 210 that is assigned to the call. Upon receipt of the slot assignment message, each CIM (204) looks through its database to determine if the callee is programmed at its corresponding console 202. If the callee is programmed and the channel assignment message indicates that the audio is not encrypted, CIM 204 connects its corresponding dispatch console 202 to the audio slot for the call. In this way, the dispatch console can monitor all unencrypted calls involving groups or units that have been programmed by the dispatcher. The MOM (205) sets up group calls, informs CIMs of smart calls, and tracks which calls have been "selected" by a dispatch console. The secondary MIMs receive a TDM bus slot assignment and a slot update from the primary MIM. Each MIM checks its unit database to determine whether the callee(s) is listed as being in its area. If the callee(s) is not in its area, then the MIM does nothing. If there is a callee(s) in its area, the MIM is designated as a secondary MIM and sets the assigned TDM bus slot bit (or clears the bit if the slot assignment says the channel is dropped) on the bit map maintained in its RAM (312) to stop subsequent updates from being sent to the interface processor (314).

Figure 5:
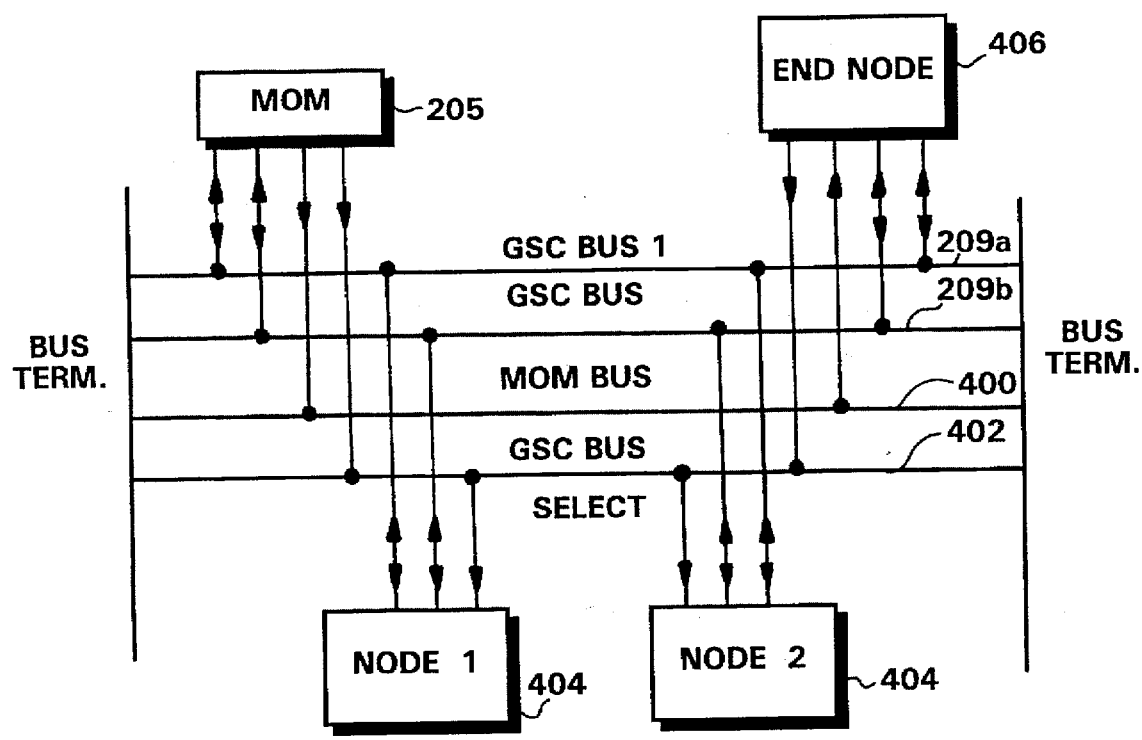
FIG. 5 is a block diagram showing the various control buses employed in the control messaging network of the multisite switch.

Each node is essentially a circuit card or board which is physically inserted into a centralized interconnect terminal which includes a back plane having all of the necessary hardware connections between the nodes, e.g. power, data, and control buses. Each node has a unique node identification number that may be dynamically assigned. In addition, DIP switches on each node card can be manually set to indicate whether that node is an "end node" (i.e., a node located at a physical "end" of message network bus 209 in the multisite switch). FIG. 5 symbolically represents the configuration of nodes connected to the back plane. As depicted, two GSC message buses 209a and 209b are bidirectionally connected to each node. End node 406 and GSC BUS 209b are provided for bus failure (i.e., break detection and prevention). In the preferred embodiment, the nodes are configured such that MOM 205 is inserted at one end of the back plane at one bus termination (e.g. the left end in FIG. 5), and an end node 406 is connected to the opposite end of the back plane (e.g. the right end in FIG. 5). Between MOM 205 and end node 406, the remaining nodes represented by nodes 1, 2, etc. (404) are bidirectionally hardwire-connected to the GSC buses 209a and 209b. All of the nodes including MOM 205 and end node 406 are also connected to a GSC bus select line 402 used to coordinate uniform node switching from one GSC control message bus to the other whenever required. A more detailed description and operation of the MOM is provided in commonly assigned U.S. application Ser. No. 08/084,944, filed Jul. 2 1993, entitled "A Multisite Trunked RF Communication System With Reliable Control Mesaging Network" and incorporated herein by reference.

In accordance with the present invention, to permit the interconnection and communication between multiple multisite switch controlled systems so as to create an extended overall communications network, one or more dedicated Network Interface Modules (NIMs) are also provided within the multisite switch. The Network Interface Module (253) consists of substantially the same hardware as used for other nodes, such as a MIM, but is software configured to allow a remote multisite switch controlled network to appear as just another node to the local multisite switch. Each network can then communicate both TDM audio and GSC message information through this common "node" interface resulting in intersystem communication that is mostly transparent to a network user. Moreover, using the basic MIM site interface design and protocol allows maximum use of existing hardware and software. Furthermore, using a plurality of network interface modules per switch, the overall communications network can easily be much extended, for example, by connecting individual multisite switch controlled networks together in a star or series configuration as explained further herein.

Figure 6:
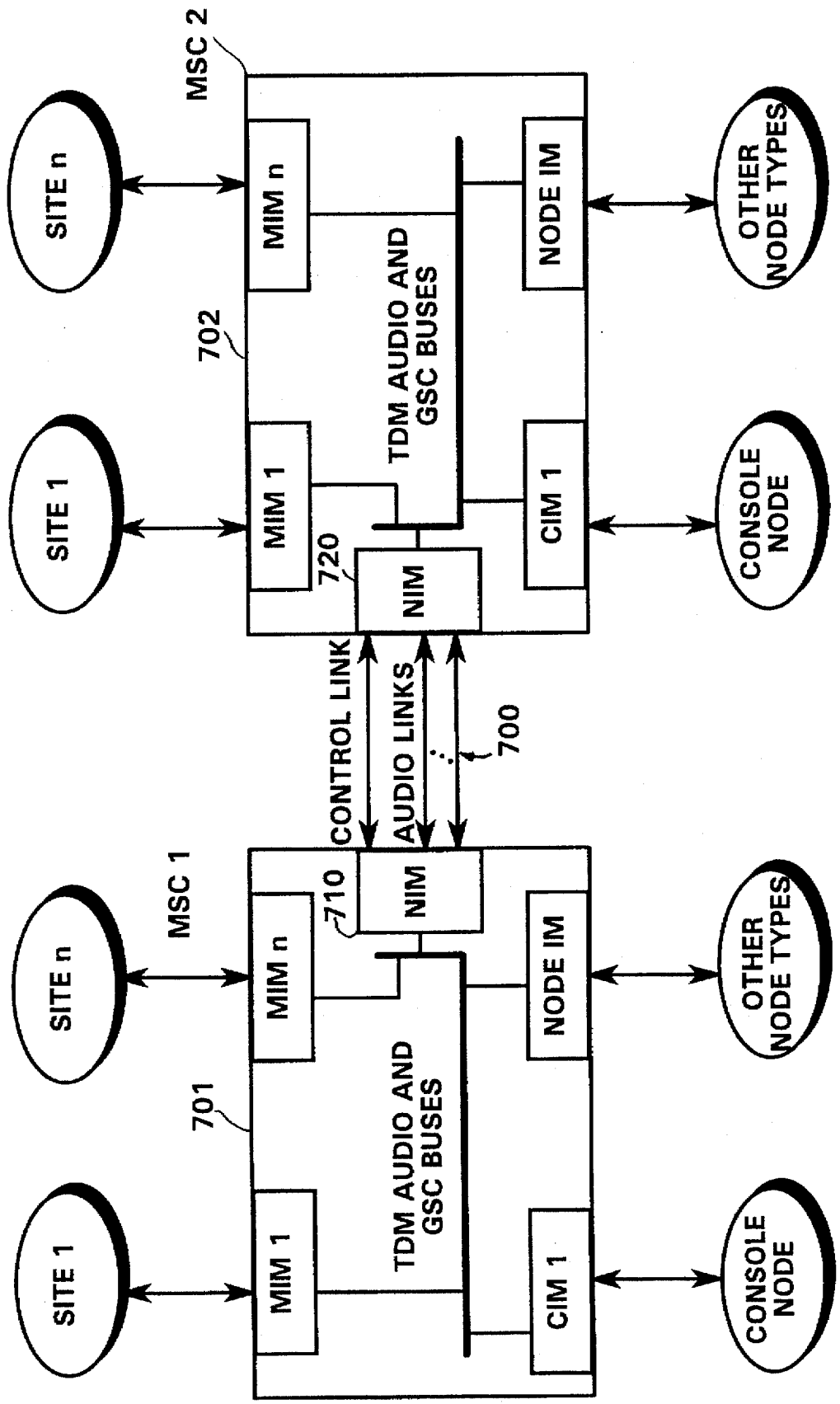
FIG. 6 is a block diagram of a pair of multisite network switches interconnected through a multisite audio and control communication link via a network interface module (NIM)
Figure 7:
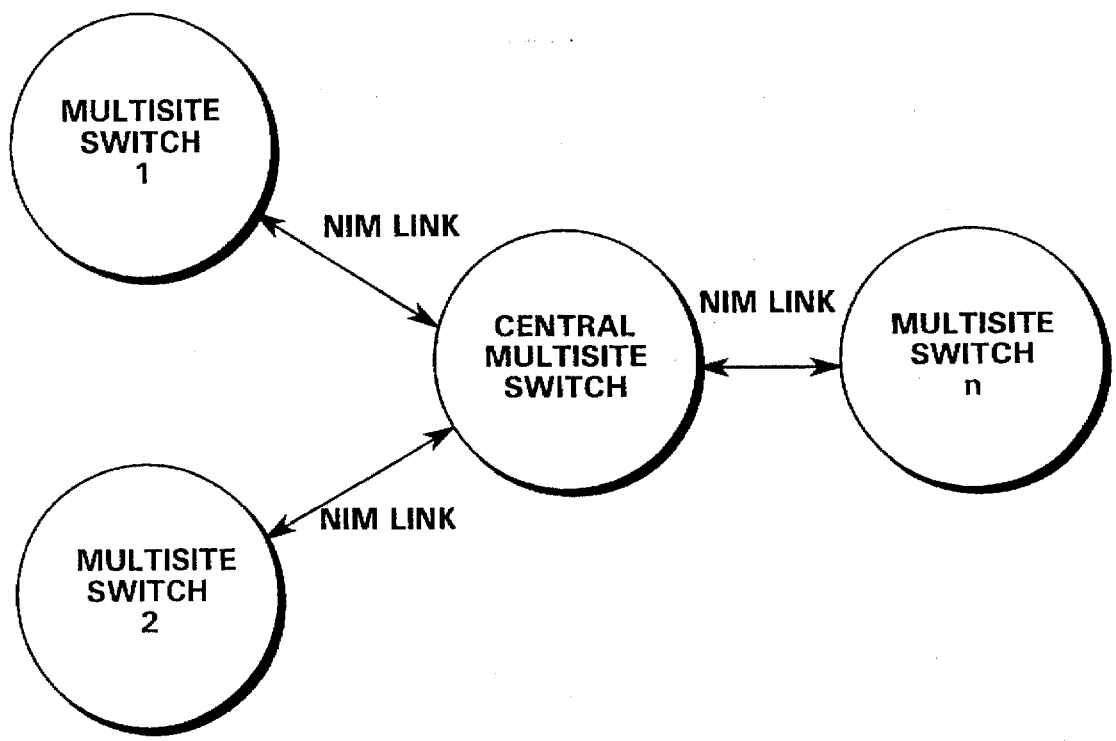
FIG. 7 is a block diagram illustrating an exemplary multiple multisite network configuration having the multisite switches of each network linked together by a central multisite network switch that contains multiple NIMs.

Referring now to FIG. 6, an exemplary extended networking arrangement is shown consisting of a pair of multisite network switches (701, 702) interconnected via NIMs (710, 720) through a multisite link (700). For the simple arrangement shown, all that is required is a single multisite link and a single NIM at each multisite switch to control the interface. Multisite link 700 consists of one internetwork control channel and up to twenty (20) internetwork audio channels and may utilize conventional T1 landline or microwave communication links. The NIM essentially performs like a virtual MIM-like site interface between two multisite switches. For a more complex extended network arrangement, multiple NIMs may be utilized at each multisite switch. For example, a "stargate" system arrangement, such as shown in FIG. 7, might consist of more than two multisite switch networks linked together by a central multisite switch network that contains multiple NIMs.

In the preferred exemplary embodiment, the NIM uses an RS232 serial link for the control link, which can configured for 9600 19.2K or 38.4K baud operation. The average control message signalling for a multisite linked call, including call set up and call teardown, requires about fifty (50) bytes (based on the MIM type protocols described in the commonly assigned related applications described above). The NIM assigns audio channels in simplex and will assign an idle audio channel for each call attempt. Such simplex channel selection allows each multisite switch to select from the full set of audio channels independently. In the unlikely event that no idle channel is available, the NIM queues the call in an assignment queue located in an internal nonvolitile RAM memory (possibly resulting in some delay).

Figure 8:
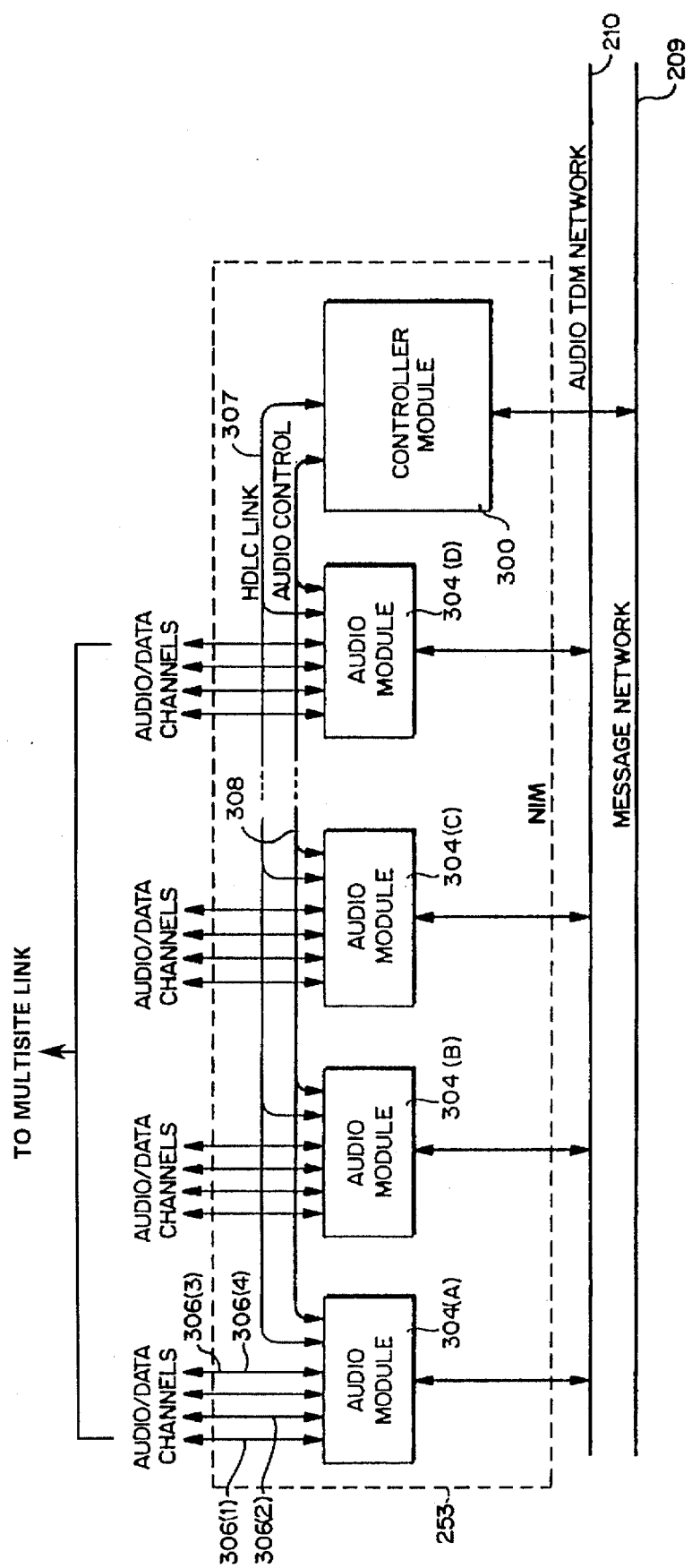
FIG. 8 is a detailed block diagram of a network interface module (NIM)

Referring to FIG. 8, the architecture of NIM 253 (similar to the MIM module described above) includes a controller module 300 and up to eight audio modules 304 which are connected to the controller via audio control bus 308 and HDLC link 307. The description and operation of controller module 300 is consistant with that described in conjunction with the interface module controller card architecture depicted in FIG. 4. The description and operation of each audio module 304 is consistent with that described above in conjunction with the architecture of the audio modules as set forth in commonly assigned U.S. patent application Ser. No. 07/658,636 entitled "Audio Routing Within Trunked Radio Frequency Multisite Switch" and incorporated herein by reference. The individual audio/data channels of NIM 253 audio modules 304 connect to corresponding internetwork communication links (channels) through a multisite link (depicted in FIG. 6). Each NIM supports up to twenty (20) internetwork audio links (channels) and at least one control link.

The NIM operation supports both transmission trunking and control message trunking using simplex or duplex communications for the audio links. To the originating multisite switch network, the NIM appears as a normal node receiving a call over the TDM audio bus (i.e., a MIM-like trunked site). To the destination multisite switch network, the NIM appears as a normal node (trunked site) originating the call. This fully trunked arrangement provides very fast access times throughout the extended network.

Each NIM controller is software configured for performing all node functions, such as tracking channel assignments, updates and idles of other interface modules of the multisite switch in its corresponding data base, in the same manner as described above for the MIMs and other nodes (see commonly assigned U.S. Pat. No. 5,239,538 identified above). In addition, each NIM is also responsible for tracking mobile communication units (operators) between linked multisite networks, monitoring call traffic on the local multisite switch network and routing any calls that have operators tracked to the remote switch network, selecting an audio channel for all calls routed by the NIM, and broadcasting all calls received from the remote mulltisite switch network to all sites/consoles on the local multisite switch. These main NIM processing tasks are now described starting with FIG. 9 which illustrates the general call traffic routing process between a NIM pair at two different multisite switch networks.

Figure 9:
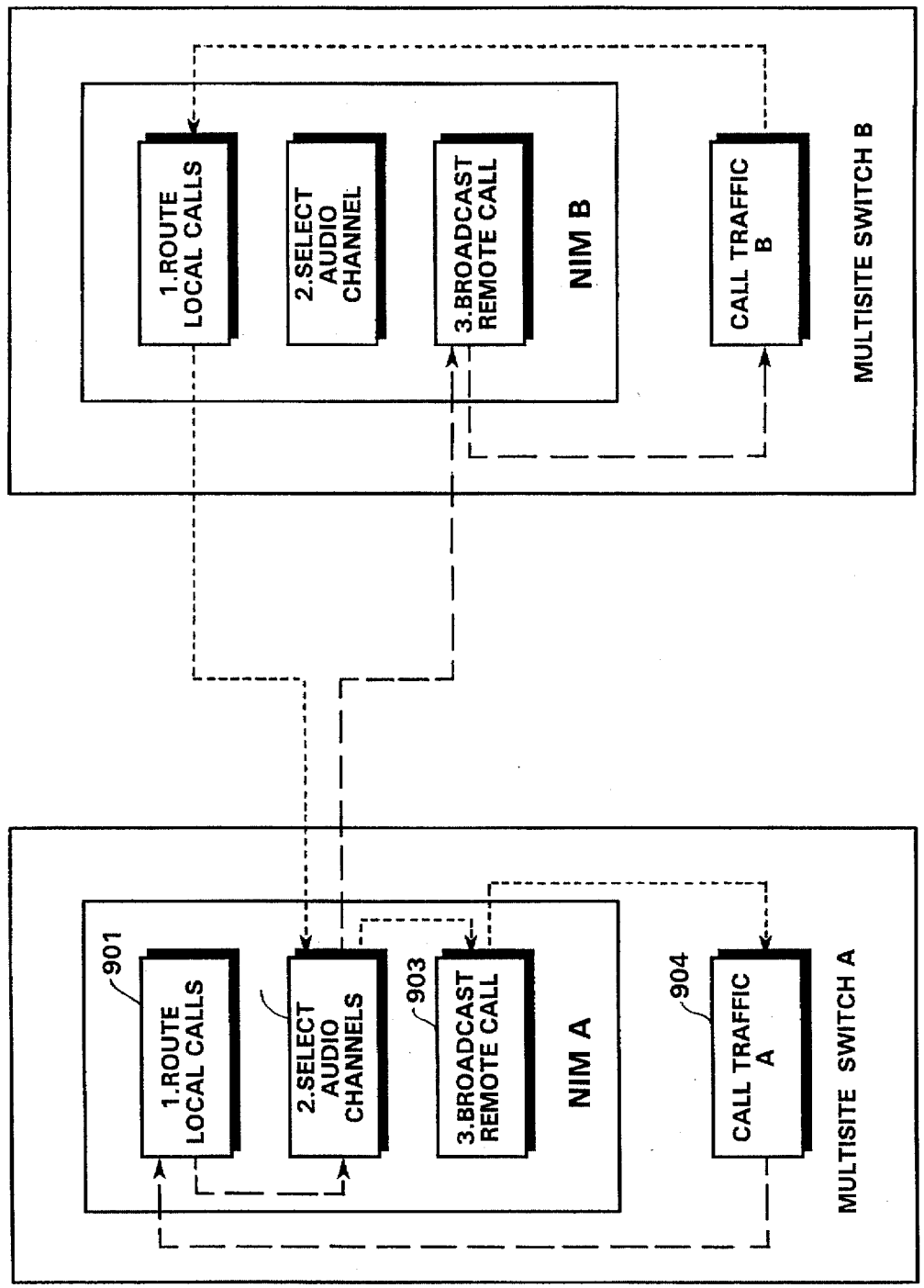
FIG. 9 is a block diagram illustrating call traffic routing between NIMs in separate networks.

Referring to FIG. 9, long dashed lines are indicative of call traffic originated on multisite switch A and dotted lines are indicative of call traffic originated on multisite switch B. As illustrated by blocks 901, 902, and 903, each NIM has the additional capability of performing three respective main processing tasks of: 1) routing local calls; 2) selecting an audio channel; and 3) broadcasting remote calls. The NIM pair initially configure themselves to operate in a Master/Slave relationship (predetermined, for example, by conventional switch or software flag settings). The Master NIM performs all channel selections so as to preclude the arising of call collision conditions (also known as "glare") resulting from the same channel being selected on both ends simultaneously. Accordingly, the audio channel selection processing task (2) is only run on one NIM of a NIM pair. In the configuration shown in FIG. 9, NIM A operates as the Master NIM. The process flow for handling internetwork communications in each NIM will now be described in conjunction with FIGS. 10A–10B.

Figure 10:
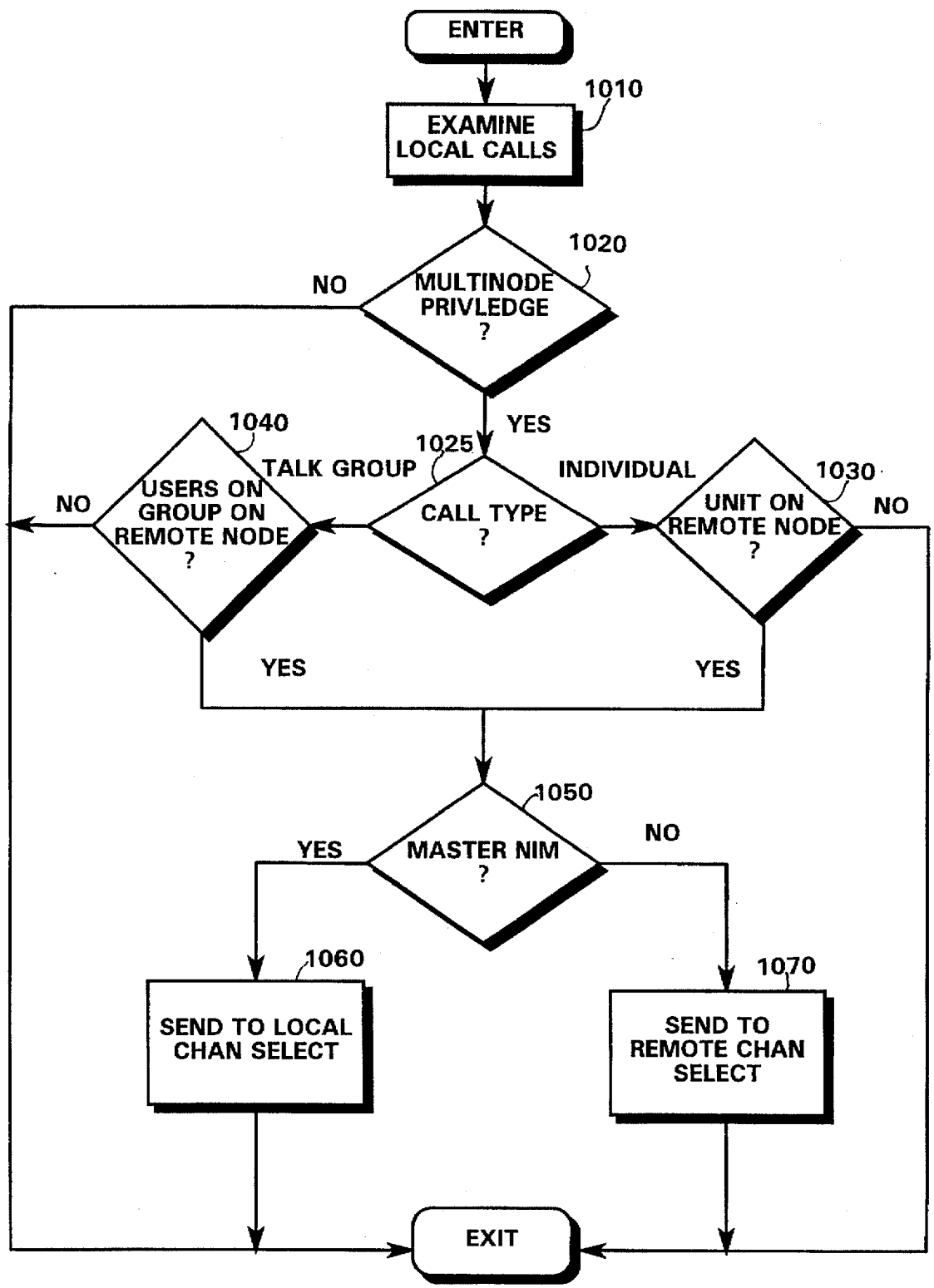
FIGS. 10A and 10B are flow diagrams outlining exemplary processing procedures for NIM call routing and channel selection in accordance with the present invention.

Referring to FIG. 10A, the NIM call routing task processing illustrated is first explained. In the present invention, a callee must be "multilink enabled" for internetwork routing to take place. Accordingly, a special multilink enable bit for this purpose must be added to the conventional multisite switch network System Manager unit/group definitions. The routing task monitors all call traffic on the local multisite switch, and picks up any calls that need to be heard on the remote switch network. The processing is similar to a MIM site interface call routing procedure. Mobile communication unit tracking information is contained in the local NIM controller memory (NIM tracking procedures discussed further below). Local multisite switch network calls are examined (block 1010). A call is routed by the local NIM only if the called entity has multinode privileges (decision block 1020), and is "tracked" to the remote multisite switch network (decision blocks 1025, 1030 and 1040). Next, the call "type" is determined (decision block 1025). For an "individual" type call, the individual mobile communication unit is tracked to the remote NIM when the individual is initially "logged on" at any trunked site on the remote network. For a "group" type call, the call is tracked to the remote NIM if any units are logged on to the group at any trunked site on the remote network. The call is not routed and is not handled by the local NIM if the call has not been tracked to a group or unit in the remote NIM (decision blocks 1030 and 1040). If the local NIM is a "master" (decision block 1050), the channel selection will be made locally by local NIM channel selection task processing (block 1060). If the local NIM is a "slave", channel selection will be handled by the master NIM at the remote network (block 1070).

The second main NIM task process of channel selection is now discussed. Briefly, as previously explained, the NIM has two different channel selection modes: Transmission trunked (simplex) and Message trunked (duplex). In the transmission trunked mode the NIM assigns a channel for a radio/console PTT (push-to-talk) signal, and drops the channel on unkey. The operation is similar to transmission trunking for a trunked MIM site, except that the NIM can route two different simplex calls in opposite directions on the same channel. In the message trunked mode, the NIM reserves a separate channel in both directions (i.e., a "duplex" channel) and keeps them "reserved" for some predetemined "hang-time" between PTT signals. This ensures that the channel is available for subsequent PTTs during the duration of a "conversation".

Figure 10B:
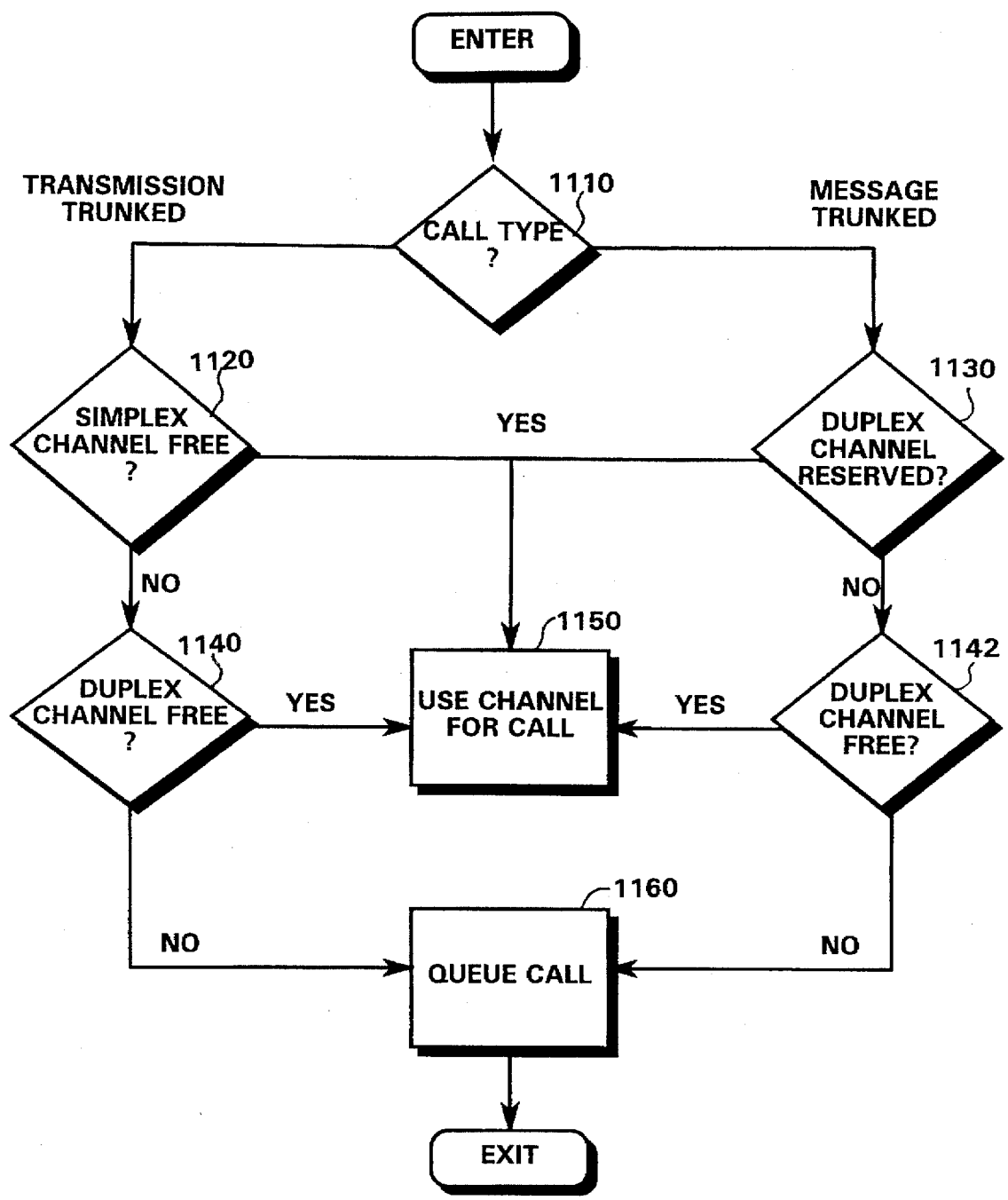

Referring now to FIG. 10B, call type is first determined (block 1110). If it is a transmission trunked call, the channel data base stored in the NIM controller is first searched for a free simplex channel (block 1120). If a simplex channel is not free, an available duplex channel is used (block 1140). If either type channel is available, it is used for the call (block 1150). If neither are available, the call is queued and channels are assigned as they become available (block 1160). If the call is a message trunked type call then the channel data base is first checked to see if a duplex channel is currently still reserved for that call (block 1142). If a reserved duplex channel is not found, the data base will be searched for an available duplex channel (block 1142). If no duplex channels are currently free, the call will be queued (block 1160). If a duplex channel is still reserved for the call or an available duplex channel is found, it is assigned to the call (block 1150).

The NIM controller also searches its entire channel data base for each call to provide error detection (e.g., calling radio already busy on another channel), and to allow prioritizing channel selection. For example, for a simplex call, a channel free only in the direction of the call is selected in favor of a channel free in both directions. This allows the former to be used by a duplex call if required.

The third main processing task (not illustrated) performed by the NIM is to broadcast the presence of an incoming remote call. The NIM on the destination multisite switch network connects the transmit audio to the multisite switch TDM audio bus slot assigned to the channel. It then broadcasts a "slot assignment" to all other interface modules (nodes) in the switch, informing them of the incoming transmit audio.

As mentioned above, all mobile communication units are tracked between networks. Tracking information is contained in a data base in every NIM controller memory. Each NIM uses the same tracking data base arrangement as a MIM (or a CIM). However, whenever a NIM changes an element in its tracking data base, it must also send a message to the remote NIM to which it is connected so that the remote NIM can update its tracking data base accordingly. Basically, a mobile communications unit is marked as "on site" at a local NIM (i.e., a software flag is set in tracking data base of that NIM), only if it is also marked as "on site" at a MIM or NIM located on a remote network to which the local NIM is connected. Likewise, a unit is marked as being "on site" at a remote NIM if the unit is logged as being "on site" by any MIM or other NIM on a local multisite switch network connected to the remote NIM. Consequently, a previous (or original) login site of a mobile unit can be tracked back between networks by noting which NIMs have the unit marked as "on site" in their tracking data base.

Figure 11A:
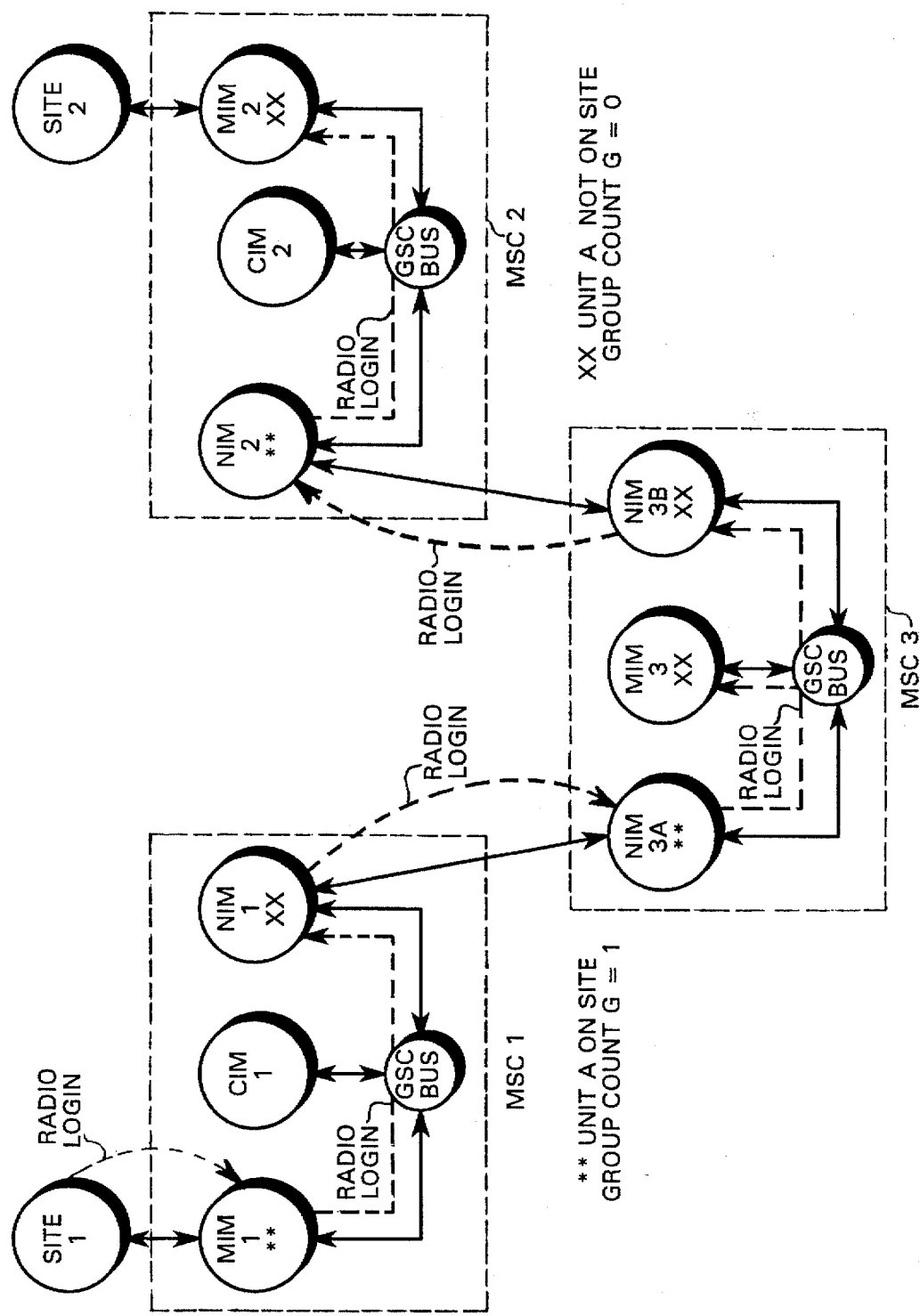
FIGS. 11A and 11B are information flow diagrams illustrating a login information flow and "on site" flag status arrangement that facilitates tracking a mobile communications unit.
Figure 11B:
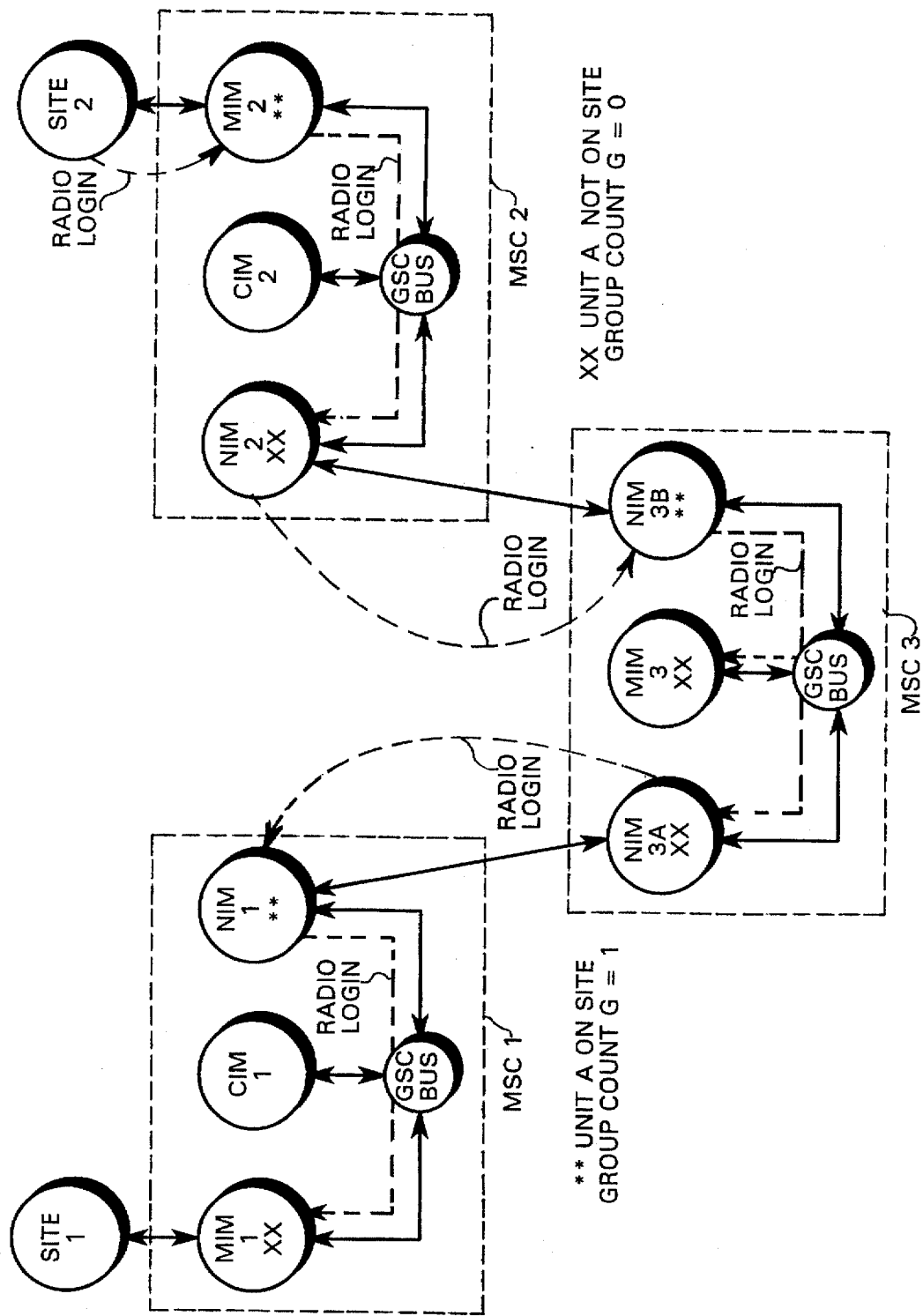

This arrangement may be more clearly illustrated by FIGS. 11A and 11B which show the flow of login information for mobile radio unit/group login procedures (dotted lines) both within and between multisite networks MSC1, MSC2 and MSC3 interconnected in an exemplary star configuration. FIG. 11A shows the login information flow and "on site" flag status for an exemplary mobile unit, "A", which logs on at site "1" on MSC1. (A "**" is used to indicate that a node has its "on site" flag set for unit "A"; a "XX" indicates that the flag is not set at the node for unit "A"). FIG. 11B shows the login information flow and "on site" flag status when mobile unit "A" roams to site "2" on MSC2. As a mobile unit attempts login at a site in a different network, it is tracked back to a site on its previous multisite switch network, the "on site" flag at that NIM is cleared, the login information for the unit is sent to the remote multisite switch and an "on site" flag in the remote NIM is set. An exemplary NIM processing procedure for tracking a mobile communications unit is depicted by the flow diagram of FIG. 12.

Figure 12:
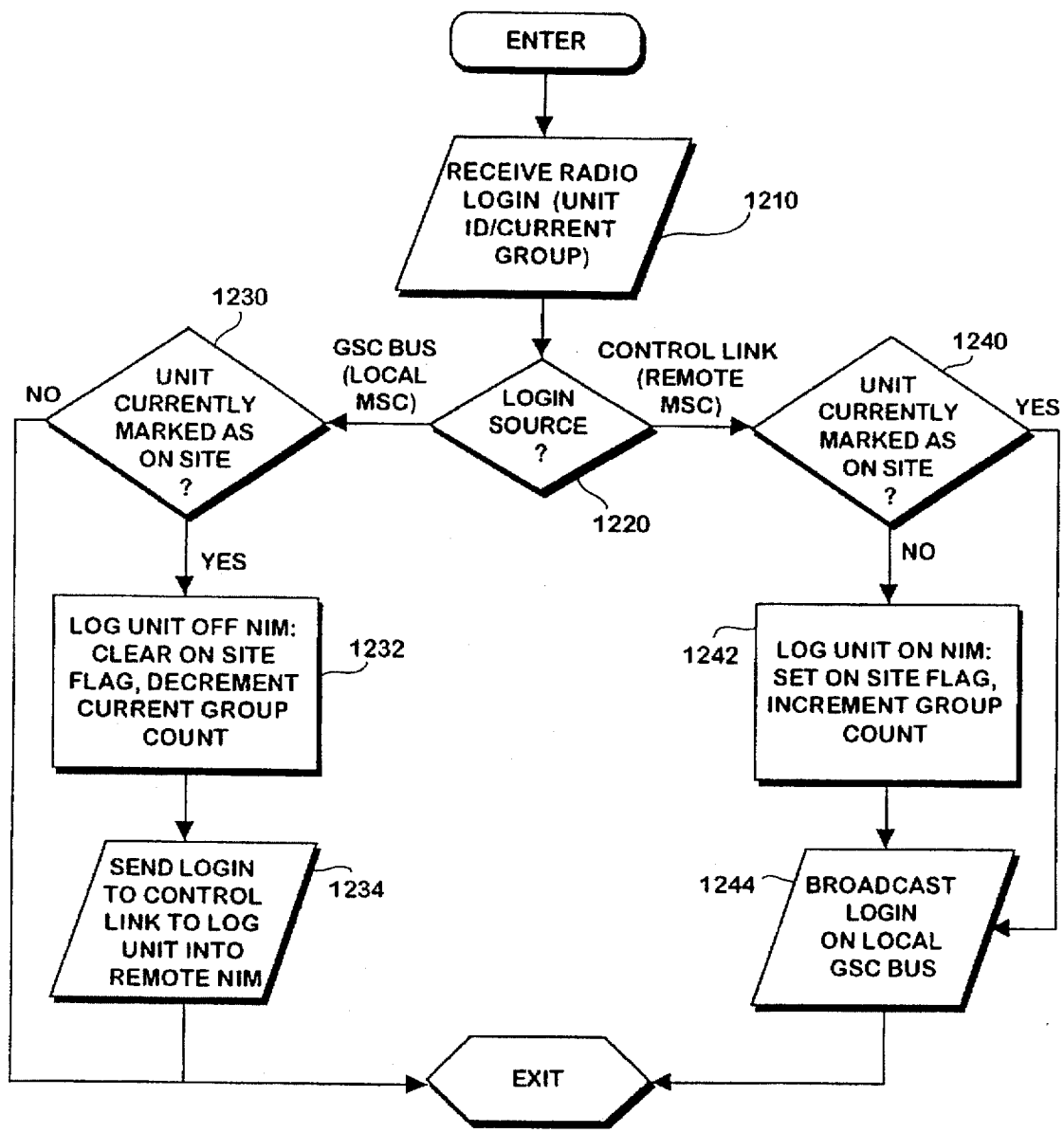
FIG. 12 is a flow diagram outlining exemplary processing procedures for NIM communications unit/group tracking in accordance with the present invention.

Referring now to FIG. 12, before mobile radio call login information (e.g., unit ID/group ID) is processed by a NIM, it first determines the source of the login information (blocks 1210 and 1220). If login information of a mobile unit which had roamed to another network was received by a NIM via its local network GSC message bus, the NIM checks its tracking data base to determine if that unit is currently marked as "on site" (block 1230). If the unit is marked as "on site", the unit is logged off the NIM by clearing its "on site" flag in the NIM tracking data base (block 1232). A "group count", indicating the number of units that are logged on site at the NIM as members of the particular call group to which that unit belongs, is also decremented. The login information is then sent to the remote NIM via the appropriate control link (block 1234). On the other hand, if the source of the login information is via the control link from another network and the NIM tracking data base indicates that the unit is not currently marked as being "on site" (block 1240), then the unit is logged on the local NIM by setting the "on site" flag, the group count is incremented (block 1242) and the login information is broadcast over the local network GSC message bus (block 1244).

Figure 13:
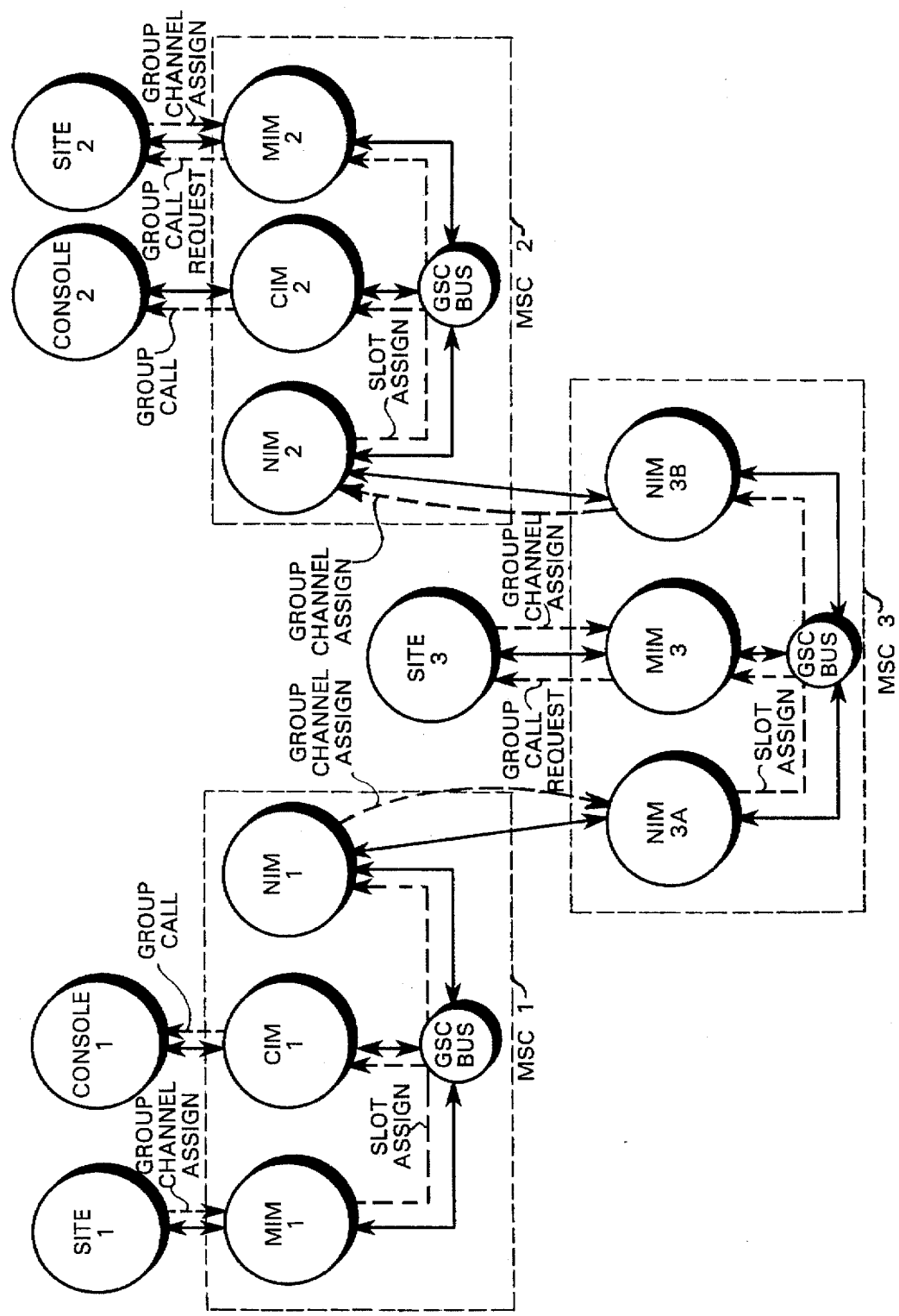
FIG. 13 is a flow diagram illustrating call group information flow between multisite networks which have mobile units tracked for a particular group.

In yet another example of call tracking, FIG. 13 illustrates the information flow that takes place between NIMs, CIMs and MIMs at multisite networks MCS1-MCS3 for a group call where sites "1", "2" and "3" in different networks have mobile units tracked for a particular group.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a first multisite digitally trunked radio frequency communications network including plural repeater sites supporting digitally encoded communications, having corresponding coverage areas and serving mobile or portable digitally trunked radio transceivers disposed within the coverage areas, a distributed control multisite switch for routing communications data between and among repeater sites and other types of analog and digital communications data sources and destinations within said network wherein said communications data includes audio signals and control messages, comprising:

a plurality of interconnected communications interface modules, each module comprising circuitry for passing communications data between particular sources and destinations within said network;

an audio signal bus and a control message bus interconnecting said interface modules, and at least one network interface module interconnected through the audio signal bus and control message bus with said communications interface modules, said network interface module comprising circuitry for transferring and receiving communications data to and from a second multisite network including a control link operatively connected to the second multisite network for transferring control messages between the control message bus and the second multisite network, and an audio link for transferring audio signals between the audio signal bus and the second multisite network, and said network interface module including a processing circuit for selecting audio signals from the audio signal bus to transfer to the second network via the audio link based on control messages received from the control message bus.

2. A distributed control multisite switch in a first digitally trunked network, as set forth in claim 1, said first digitally trunked network being electronically linked to one or more separate networks each also including a distributed control multisite switch comprising at least one network interface module.

3. A distributed control multisite switch in a first digitally trunked network, as set forth in claim 1, further comprising a plurality of network interface modules, wherein said first digitally trunked network operates as a central network in a star configuration of interconnected networks, and each of said interconnected networks has at least one network interface module.

4. A method for permitting the interfacing of two or more digitally trunked radio frequency communications networks, each network including at least one repeater site supporting digitally encoded communications, having a corresponding coverage area and serving mobile or portable digitally trunked radio transceivers disposed within the coverage area, and each including a distributed control multisite switch having audio bus and a control message bus for routing communications between and among repeater sites and other communications data sources and destinations within the network, comprising steps of:

a) monitoring the control message bus for control messages of all calls routed by a multisite switch of a first network, identifying calls designated for another network based on the control messages, and routing audio signals of the calls designated for another network to an internetwork communications link connected between said multisite switch of said first network and another multisite switch located in a second network;

b) searching for and selecting an available communications data channel on said internetwork link; and c) alerting all call destinations in said first network via the control bus of said multisite switch of said first network to the presence of incoming audio signal calls from the another network on said internetwork link.

5. A multiple multisite network arrangement forming an extended coverage area communications system, comprising:

a first multisite network of one or more communication units for conducting analog and/or digital communications including a digitized-audio switching arrangement comprising a digitized-audio signal network bus and a digital serial channel message network bus for routing communications between digital repeater sites and other analog/digital communication sources/destinations within said first network;

an internetwork link comprising at least one internetwork digitized-audio signal channel and an internetwork digital control message communications channel;

said first network further comprising one or more dedicated network interface modules connected to said digitized-audio signal network bus, said digital serial channel message network bus, and said internetwork link for communicating both digitized-audio information and digital control message information to/from another digitized-audio switching arrangement associated with a second multisite network, said modules each including a processing circuit for selecting audio signals from the digitized-audio signal network bus and the internetwork link to transfer to/from a second multisite network based on control messages received from the digitized serial channel message network bus and the internetwork link;

wherein a network interface module enables a second network to function as another node on said first network to provide internetwork communications that are essentially transparent to a user of either network effectively resulting in an extended coverage area communications system.

6. An extended communications system according to claim 5, wherein a digitized-audio switching arrangement associated with said second network includes at least one network interface module and is electronically linked to said first network via a network interface module at each network.

7. An extended communications system according to claim 5, further comprising at least second and third networks electronically linked to said first network via a network interface module at each network, said first network acting as a central network in a star configuration of interconnected networks, wherein said first network includes multiple network interface modules for interfacing to a plurality of networks.

8. An extended communications system according to claim 5, wherein said second multisite network includes at least one network interface module coupled to said internetwork link.

9. An extended communications system according to claim 5, further comprising at least second and third multisite networks, each having at least one network interface module and each communicating with said first multisite network via separate internetwork links, said first network acting as a central network in a star configuration of interconnected networks, wherein said first network includes a plurality of network interface modules for interfacing to a plurality of multisite networks such that each of said multisite networks appears as a single node on said first multisite network.

10. In a first digitally trunked radio frequency communications system including multiple RF transceiving sites for establishing radio contact with mobile and/or portable radio transceivers via trunked RF communications channels based on received and transmitted trunking control signals, a distributed control audio signal multisite switch routing audio signals between said multiple RF transceiving sites, said multisite switch comprising:

at least one multiplexed digitized-audio signal bus;

a message network for communicating trunking control messages; and at least one internetwork interface controller in communication with a second digitally trunked radio frequency communications system, said internetwork interface controller for:

(a) applying audio signals received from said digitized-audio signal bus for routing to an internetwork bus connecting the internetwork controller in said first digitally trunked radio frequency communications system with an second internetwork interface controller in said second digitally trunked radio frequency communications system;

(b) applying trunking control messages to said internetwork bus based on digital trunking signals received from said message network in the first digitally trunked radio frequency communications system;

(c) receiving trunking control messages and audio signals from said internetwork bus; and (d) autonomously determining whether to route from the digitized-audio signal bus to the internetwork bus the audio signals received in step (a) based at least in part on said trunking control signals received by said step (c).

\* \* \* \* \*